(12) United States Patent
Gupta et al.

(10) Patent No.: US 10,866,752 B2
(45) Date of Patent: Dec. 15, 2020

(54) RECLAIMING STORAGE SPACE IN RAIDS MADE UP OF HETEROGENEOUS STORAGE DRIVES

(71) Applicant: International Business Machines Corporation, Armonk, NY (US)

(72) Inventors: Lokesh M. Gupta, Tucson, AZ (US); Matthew G. Borlick, Tucson, AZ (US); Kevin J. Ash, Tucson, AZ (US); Karl A. Nielsen, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 16/162,390

(22) Filed: Oct. 17, 2018

(65) Prior Publication Data

US 2020/0125284 A1 Apr. 23, 2020

(51) Int. Cl.
*G06F 3/06* (2006.01)

(52) U.S. Cl.
CPC .......... *G06F 3/0644* (2013.01); *G06F 3/0607* (2013.01); *G06F 3/0631* (2013.01); *G06F 3/0664* (2013.01); *G06F 3/0689* (2013.01)

(58) Field of Classification Search
CPC .... G06F 3/0607; G06F 3/0631; G06F 3/0644; G06F 3/0664; G06F 3/0689
See application file for complete search history.

(56) References Cited

U.S. PATENT DOCUMENTS

| | | | |
|---|---|---|---|
| 5,696,934 A | 12/1997 | Jacobson et al. | |
| 7,136,809 B2 | 11/2006 | Husain et al. | |
| 7,454,566 B1 * | 11/2008 | Overby | G06F 3/0644 711/114 |
| 7,613,945 B2 | 11/2009 | Soran et al. | |
| 7,681,007 B2 | 3/2010 | Rustagi et al. | |
| 7,945,810 B2 | 5/2011 | Soran et al. | |
| 8,713,127 B2 | 4/2014 | Menghnani | |
| 2005/0166011 A1 | 7/2005 | Burnett et al. | |
| 2014/0325146 A1 * | 10/2014 | Madhusudana | G06F 3/0689 711/114 |
| 2018/0081757 A1 * | 3/2018 | Chiba | G06F 3/0689 |
| 2019/0205053 A1 * | 7/2019 | Nomura | G06F 3/0689 |

FOREIGN PATENT DOCUMENTS

WO WO-2018131127 A1 * 7/2018 ............... G06F 3/06

* cited by examiner

*Primary Examiner* — Aracelis Ruiz
(74) *Attorney, Agent, or Firm* — Nelson and Nelson; Daniel P. Nelson; Alexis V. Nelson

(57) ABSTRACT

A method for reclaiming storage space in RAID arrays made up of heterogeneous storage drives is disclosed. In one embodiment, such a method includes determining a most common storage capacity for a set of storage drives utilized in a storage system. The method further identifies physical storage drives from the set that contain unused storage space. The method pools the unused storage space of the physical storage drives to create virtual storage drives with storage capacities substantially equal to the most common storage capacity. The method then utilizes the virtual storage drives in existing or new RAID arrays. A corresponding system and computer program product are also disclosed.

20 Claims, 6 Drawing Sheets

RECLAIMING STORAGE SPACE IN RAIDS MADE UP OF HETEROGENEOUS STORAGE DRIVES

BACKGROUND

Field of the Invention

This invention relates to systems and methods for reclaiming storage space in RAID arrays made up of heterogeneous storage drives.

Background of the Invention

A RAID (i.e., a Redundant Array of Independent Disks) is a storage technology that provides increased storage functions and reliability through redundancy. A RAID is created by combining multiple storage drive components (disk drives and/or solid state drives) into a logical unit. Data is then distributed across the drives using various techniques, referred to as "RAID levels." The standard RAID levels, which currently include RAID levels 1 through 6, are a basic set of RAID configurations that employ striping, mirroring, and/or parity to provide data redundancy. Each of the configurations provides a balance between two key goals: (1) increasing data reliability and (2) increasing I/O performance.

In some cases, although not always ideally, a RAID may be implemented using a heterogeneous set of storage drives. That is, a RAID may in certain cases be implemented using storage drives having different storage capacities and/or I/O performance characteristics. In some cases, the set of storage drives making up a RAID may start out homogenous but become more heterogeneous over time as some storage drives are replaced with other storage drives that are faster, less expensive, or larger in terms of storage capacity. Although a homogeneous RAID (i.e., a RAID made up of identical storage drives) may be preferred in terms of providing desired and predictable I/O performance, it may not always be practical or cost-effective, particularly with very large arrays of storage drives, such as large distributed arrays. However, implementing a RAID using a heterogeneous set of storage drives may cause the RAID to run at the performance of the lowest-performing storage drive in the RAID. This effectively renders useless or ineffective any extra performance and/or storage capacity of other storage drives in the RAID.

In view of the foregoing, what are needed are systems and methods to reclaim and repurpose unused storage space in RAID arrays made up of heterogeneous storage drives.

SUMMARY

The invention has been developed in response to the present state of the art and, in particular, in response to the problems and needs in the art that have not yet been fully solved by currently available systems and methods. Accordingly, the invention has been developed to reclaim and repurpose unused storage space in RAID arrays made up of heterogeneous storage drives. The features and advantages of the invention will become more fully apparent from the following description and appended claims, or may be learned by practice of the invention as set forth hereinafter.

Consistent with the foregoing, a method for reclaiming storage space in RAID arrays made up of heterogeneous storage drives is disclosed. In one embodiment, such a method includes determining a most common storage capacity for a set of storage drives utilized in a storage system. The method further identifies physical storage drives from the set that contain unused storage space. The method pools the unused storage space of the physical storage drives to create virtual storage drives with storage capacities substantially equal to the most common storage capacity. The method then utilizes the virtual storage drives in existing or new RAID arrays.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
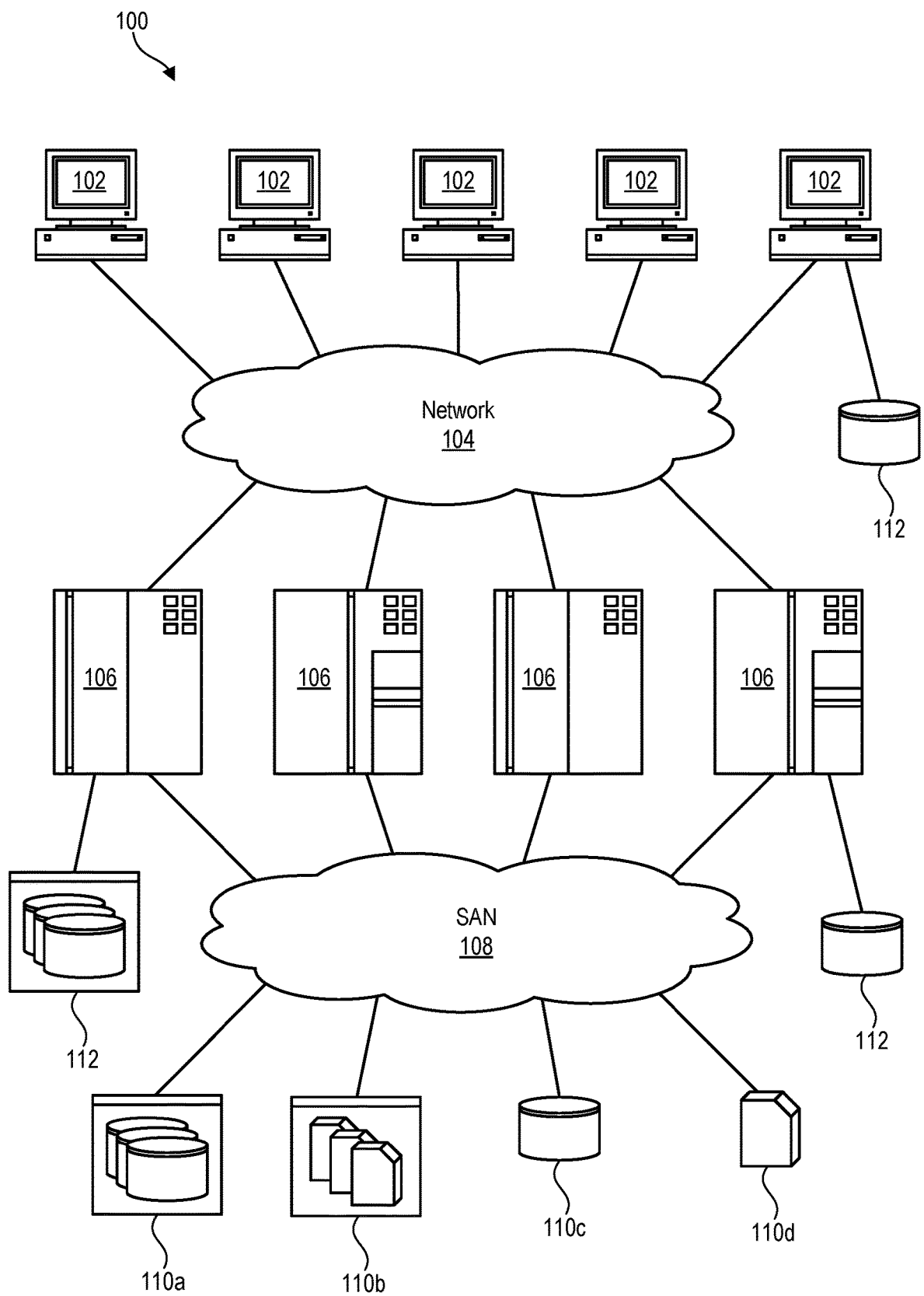
FIG. 1 is a high-level block diagram showing one example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-storage drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI.

Figure 2:
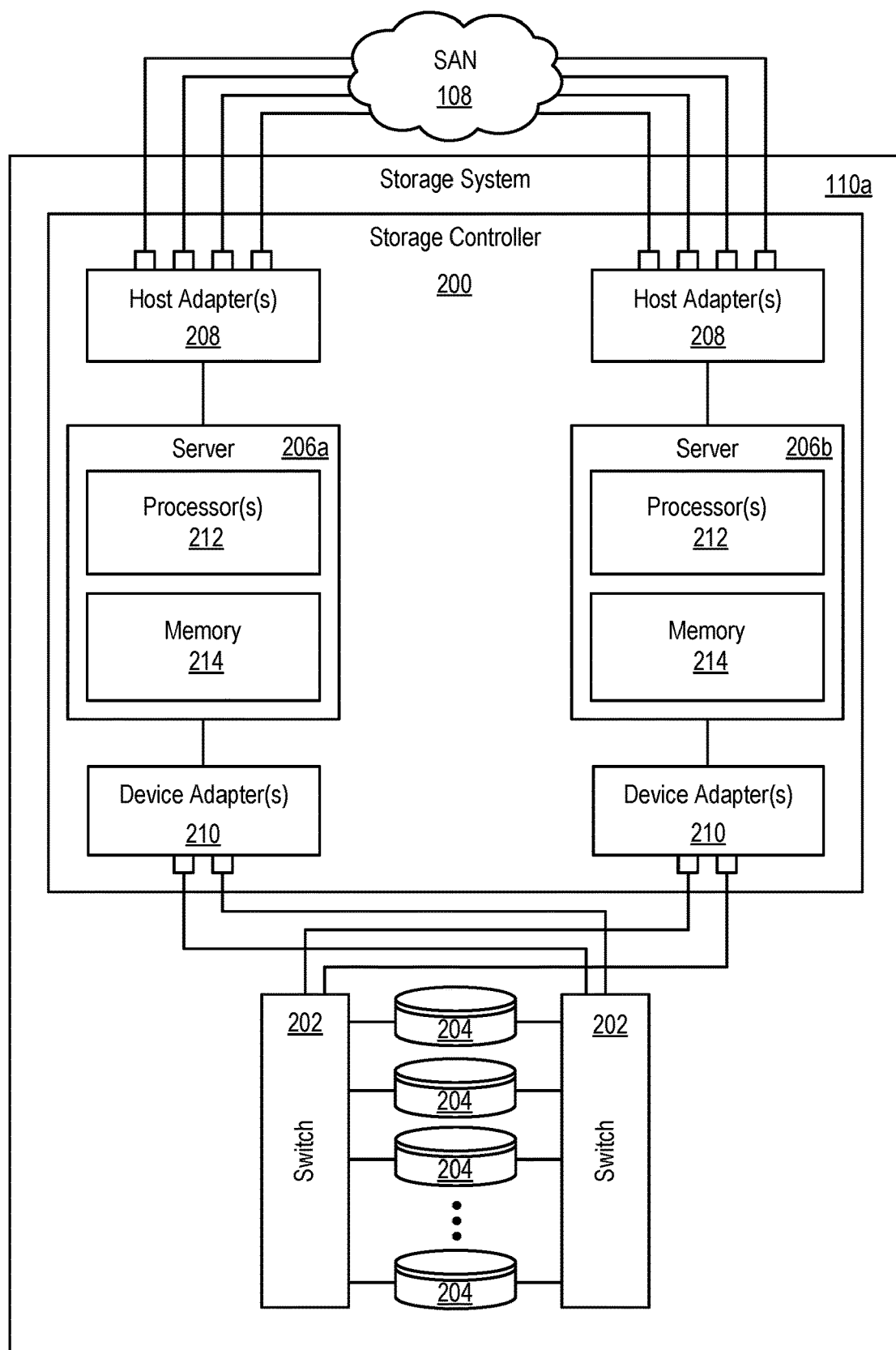
FIG. 2 is a high-level block diagram showing one embodiment of a storage system containing multiple storage drives.

Referring to FIG. 2, one example of a storage system 110a containing an array of hard-disk drives 204 and/or solid-state drives 204 is illustrated. The internal components of the storage system 110a are shown since a RAID may, in certain embodiments, be implemented all or partly within such a storage system 110a. As shown, the storage system 110a includes a storage controller 200, one or more switches 202, and one or more storage drives 204, such as hard-disk drives 204 and/or solid-state drives 204 (e.g., flash-memory-based drives 204). The storage controller 200 may enable one or more hosts 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

One example of a storage system 110a having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the techniques disclosed herein are not limited to the IBM DS8000™ enterprise storage system 110a, but may be implemented in any comparable or analogous storage system 110, regardless of the manufacturer, product name, or components or component names associated with the system 110. Any storage system that could benefit from one or more embodiments of the invention is deemed to fall within the scope of the invention. Thus, the IBM DS8000™ is presented only by way of example and not limitation.

Figure 3:
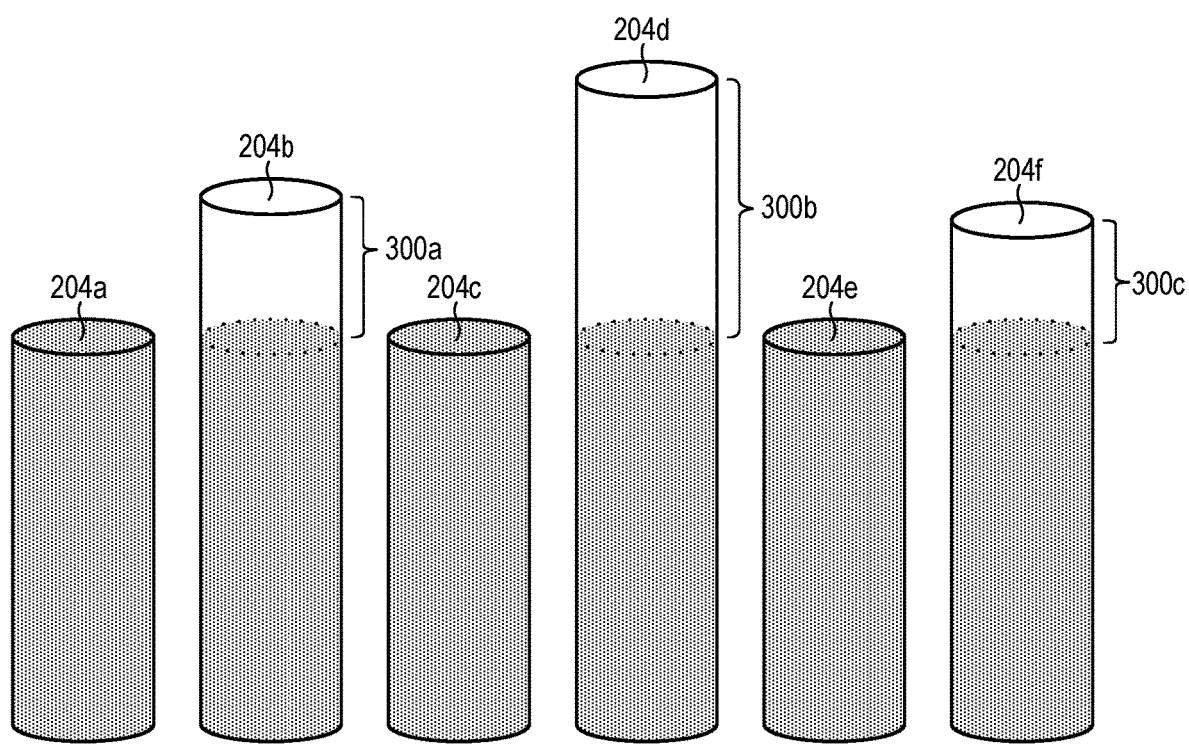
FIG. 3 is a high-level block diagram showing unused storage space in various storage drives of an array.

Referring to FIG. 3, in certain embodiments in accordance with the invention, physical storage drives 204 in a storage system 110 may be used to create RAIDs (i.e., Redundant Arrays of Independent Disks) to provide increased storage functions and reliability through redundancy. A RAID is created by combining multiple storage drive components 204 (disk drives 204 and/or solid state drives 204) into a logical unit. Data is then distributed across the drives 204 using various techniques, referred to as "RAID levels." The standard RAID levels, which currently include RAID levels 1 through 6, are a basic set of RAID configurations that employ striping, mirroring, and/or parity to provide data redundancy. Each of the configurations provides a balance between two key goals: (1) increasing data reliability and (2) increasing I/O performance.

In some cases, although not always ideally, a RAID may be implemented using a heterogeneous set of storage drives 204. That is, a RAID may in certain cases be implemented using storage drives 204 having different storage capacities and/or I/O performance characteristics. In some cases, the set of storage drives 204 making up a RAID may start out homogenous but become more heterogeneous over time as some storage drives 204 are replaced with other storage drives 204 that are faster, less expensive, or larger in terms of storage capacity. Although a homogeneous RAID (i.e., a RAID made up of identical storage drives 204) may be preferred in terms of providing desired and predictable I/O performance, it may not always be practical or cost-effective, particularly with very large arrays of storage drives, such as large distributed arrays. However, implementing a RAID using a heterogeneous set of storage drives 204 may cause the RAID to run at the performance of the lowest-performing storage drive 204 in the RAID. This effectively renders useless or ineffective any extra performance and/or storage capacity of other storage drives 204 in the RAID.

In certain embodiments, systems and methods in accordance with the invention may be provided to reclaim and repurpose unused storage space in RAID arrays made up of heterogeneous storage drives 204. Such systems and methods may analyze storage drives 204 in a storage system 110 to find storage drives 204 with unused storage capacity 300. For example, FIG. 3 shows a set of storage drives 204a-f with differing storage capacities. In certain embodiments, these storage drives 204 may participate in a RAID that functions in accordance with a specific RAID level. When the storage drives 204 are configured in a RAID, some storage drives 204b, 204d, 204f may have more storage capacity than other storage drives 204 in the RAID. In certain cases, the differing storage capacities may be the result of using heterogeneous storage drives 204 to create the RAID. More often, the RAID was created from homogeneous storage drives 204 but then became heterogeneous as spares of different performance and/or storage capacities were introduced into the RAID in response to storage drive failures. For example, in the embodiment illustrated in FIG. 3, the storage drives 204a, 204c, 204e may be original physical storage drives 204 in a RAID and the physical storage drives 204b, 204d, 204f may be drives that were introduced to the RAID after storage drive failures.

As shown in FIG. 3, the shaded portion of each storage drive 204a-f represents the storage capacity of each storage drive 204 utilized to implement a RAID. The unshaded portions 300 represent the unused storage space 300 in each storage drive 204. As will be explained in more detail hereafter, the unused storage space 300 may, in certain embodiments, be repurposed so that it serves a useful purpose and is not wasted.

Figure 4:
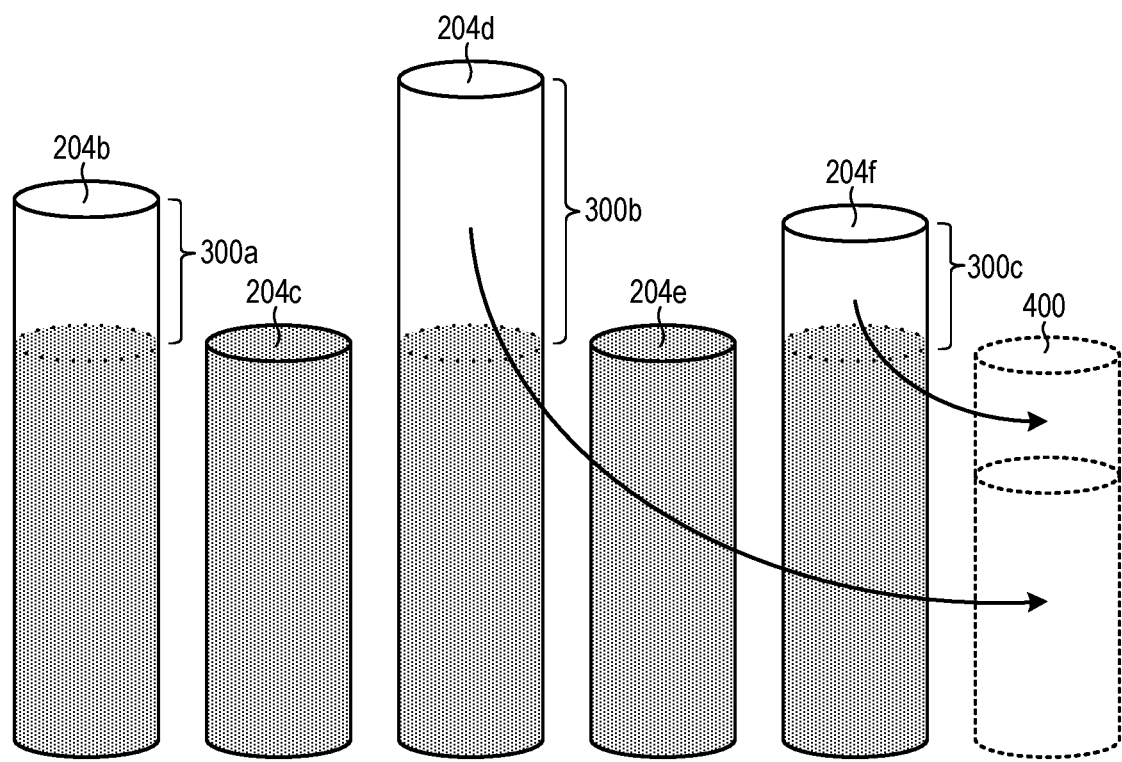
FIG. 4 is a high-level block diagram showing the creation of a virtual storage drive using unused storage space in selected physical storage drives.

Referring to FIG. 4, in certain embodiments in accordance with the invention, the unused storage space 300 in each storage drive 204 may be combined to create one or more virtual storage drives 400. In certain embodiments, the virtual storage drives 400 may be usable in much the same way as physical storage drives 204. For example, the virtual storage drives 400, like physical storage drives 204, may store data and participate in RAIDs. In certain embodiments, the virtual storage drive 400 may be mixed with physical storage drives 204 to create RAIDs. In other embodiments, the virtual storage drive 400 may be used exclusively with other virtual storage drives 400 to create RAIDs.

In certain embodiments, the virtual storage drive 400 may be sized to reflect the storage capacity of other storage drives 204 in the storage system 110. For example, in one embodiment, the storage drives 204 in a storage system 110 are analyzed to determine the most common storage capacity. The virtual storage drive 400 may be created with a storage capacity that is substantially equal to the most common storage capacity. In this way, the virtual storage drive 400 may contribute to the homogeneity of storage drives 204 in the storage system 110. This may enable RAIDs to be created with less waste and unused storage space 300, or a virtual storage drive 400 to be used as a spare in a RAID with storage drives 204 of substantially equal storage capacity.

In certain embodiments, the unused storage space 300 from multiple physical storage drives 204 may be used to create a virtual storage drive 400 with a storage capacity substantially equal to the most common storage capacity. For example, as shown in FIG. 4, the unused storage space 300b from the storage drive 204d and the unused storage space 300c from the storage drive 204f may be used to create the virtual storage drive 400. As shown, the virtual storage drive 400 has a storage capacity that is substantially equal to the storage drives 204c, 204e, which may be storage drives 204 with the most common storage capacity.

If not enough unused storage space 300 is available to create a virtual storage drive 400 with storage capacity substantially equal to the most common storage capacity, the unused storage space 300 may be combined to create a virtual storage drive 400 with storage capacity substantially equal to the next most common storage capacity in the storage system 110, or as close to the most common storage capacity as possible. In this way, virtual storage drives 400 may be created with storage capacities that are most useful and efficient in the storage system 110.

Figure 5:
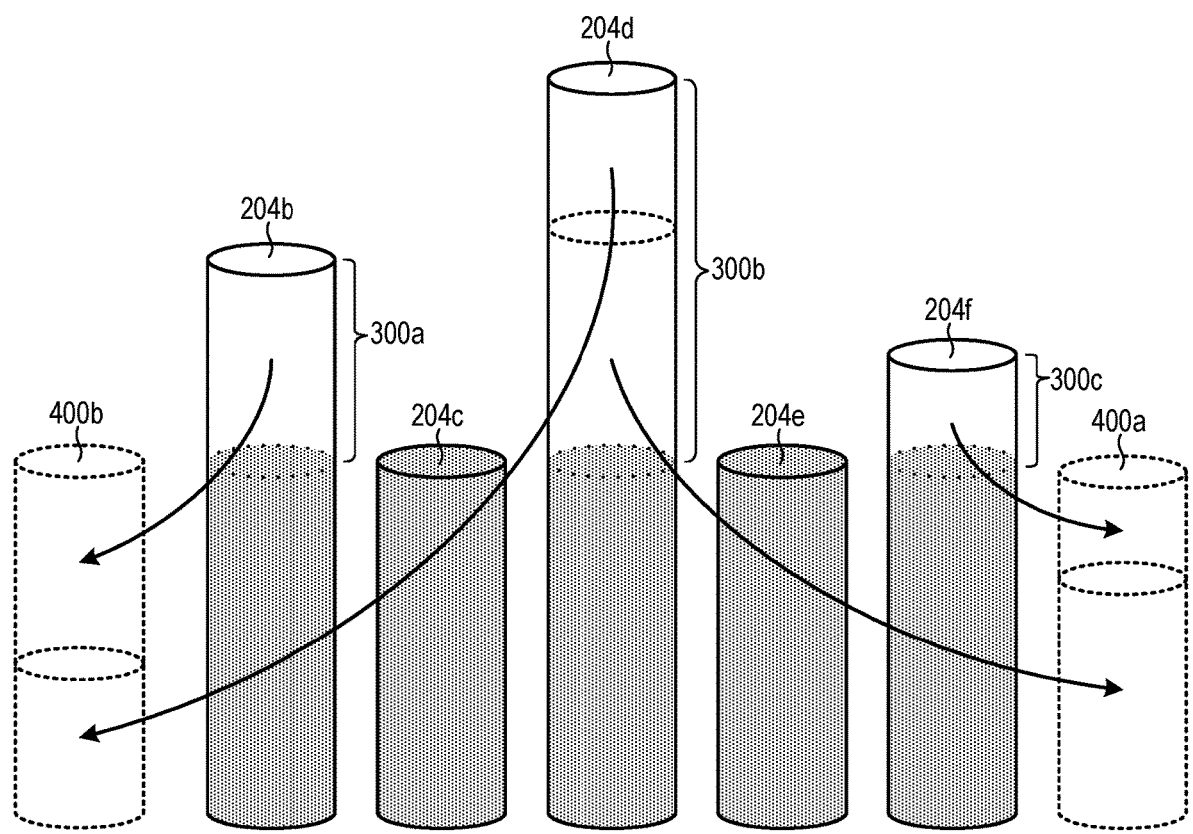
FIG. 5 is a high-level block diagram showing the creation of multiple virtual storage drives using unused storage space in selected physical storage drives.

Referring to FIG. 5, in certain embodiments in accordance with the invention, the unused storage capacity 300 of a single physical storage drive 204 may be divided among several virtual storage drives 400. For example, as shown in FIG. 5, the unused storage capacity 300b of the physical storage drive 204d is divided between the virtual storage drive 400a and the virtual storage drive 400b in order to create two virtual storage drives 400a, 400b with storage capacities substantially equaling the most common storage capacity in the array. As further shown, the unused storage capacities 300a, 300c of the physical storage drives 204b, 204f also contribute to the storage capacities of the virtual storage drives 400a, 400b. The unused storage capacity 300 of a physical storage drive 204 may be divided and distributed in different ways to create virtual storage drives 400 of desired storage capacities.

In certain cases, when unused storage space 300 from multiple physical storage drives 204 is combined to create a virtual storage drive 400, efforts may be taken to combine unused storage space 300 from physical storage drives 204 with similar performance characteristics. This will ensure that all storage capacity in a virtual storage drive 400 exhibits the same or similar performance characteristics. This will also allow the virtual storage drive 400 to be matched with virtual storage drives 400 or physical storage drives 204 with similar performance characteristics, such as when creating a RAID.

Figure 6:
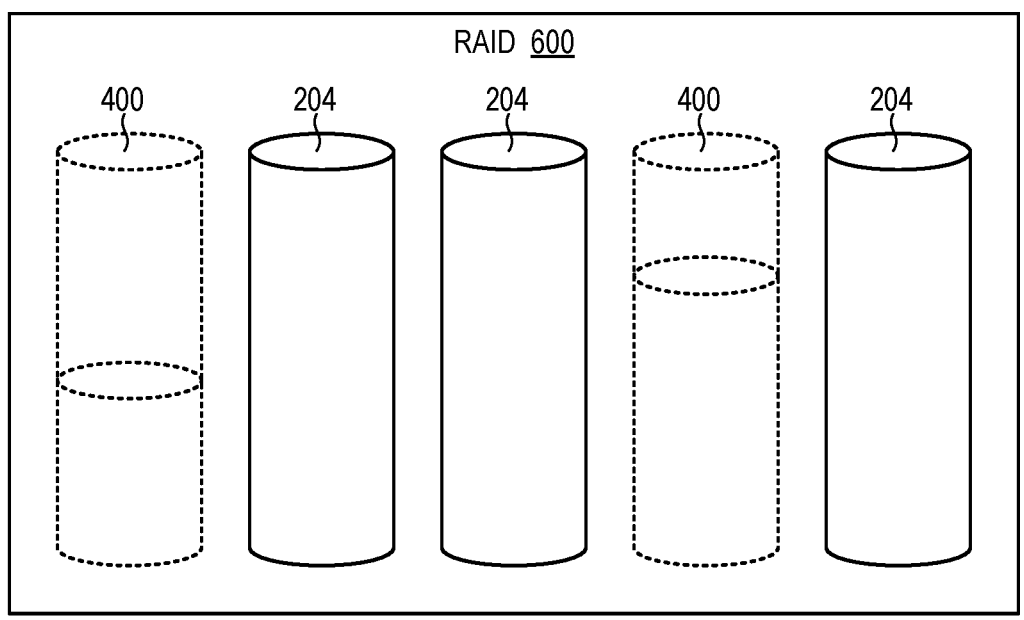
FIG. 6 is a high-level block diagram showing a RAID using a combination of virtual storage drives and physical storage drives.

Referring to FIG. 6, as previously mentioned, after virtual storage drives 400 are created from unused storage space 300, the virtual storage drives 400 may be combined with other virtual storage drives 400 or physical storage drives 204 to create RAIDs 600. In certain embodiments, the virtual storage drives 400 may only be mixed with other virtual storage drives 400 to create RAIDs 600. In other embodiments, the virtual storage drives 400 may be mixed with physical storage drives 204 to create RAIDs 600, as shown in FIG. 6. Alternatively, or additionally, the virtual storage drives 400 may be used as spares in RAIDs 600.

When utilizing a virtual storage drive 400 in a RAID 600, care may be taken to ensure that performance and/or reliability requirements are not compromised when incorporating the virtual storage drive 400 into the RAID 600. For example, if a virtual storage drive 400 is added to a RAID 600 that utilizes storage space from a physical storage drive 204 that is also part of the RAID 600, data redundancy and/or performance associated with the RAID 600 may be lost or impaired. For example, if the physical storage drive 204 were to fail, the virtual storage drive 400 may also fail since it utilizes unused storage space 300 on the physical storage drive 204. In effect, this may cause two "storage drives" in the RAID 600 to fail, possibly causing irreversible data loss depending on the RAID level that is used.

Thus, in certain embodiments, precautions may be taken to ensure that, when incorporating a virtual storage drive 400 into a RAID 600, performance and/or redundancy requirements associated with a particular RAID level are maintained. For example, referring again to FIG. 5, if the virtual storage drives 400a, 400b are created from unused storage space 300 from the physical storage drive 204b, 204d, 204f, precautions may be taken to ensure that the virtual storage drive 400a is not utilized in the same RAID 600 as physical storage drives 204d, 204f since failure of either of the physical storage drives 204d, 204f would also cause the virtual storage drive 400a to fail. Similarly, precautions may be taken to ensure that the virtual storage drive 400b is not utilized in the same RAID 600 as physical storage drives 204b, 204d since failure of either of the physical storage drives 204b, 204d would also cause the virtual storage drive 400b to fail. Similarly, precautions may be taken to ensure that the virtual storage drive 400a is not utilized in the same RAID 600 as the virtual storage drive 400b since both virtual storage drives 400a, 400b share unused storage space 300 from the same physical storage drive 204d and failure of the physical storage drive 204d would cause the failure of both virtual storage drives 400a, 400b.

The flowcharts and/or block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for reclaiming storage space in RAID arrays made up of heterogeneous storage drives:
   determining a most common storage capacity for a plurality of physical storage drives in a storage system;
   identifying, from the plurality of physical storage drives, physical storage drives that contain unused storage space;
   pooling the unused storage space to create virtual storage drives with storage capacities substantially equal to the most common storage capacity; and
   utilizing the virtual storage drives in the storage system to create RAID arrays.

2. The method of claim 1, wherein pooling the unused storage space to create virtual storage drives comprises creating a single virtual storage drive by using the storage space from multiple physical storage drives.

3. The method of claim 1, wherein utilizing the virtual storage drives in the storage system comprises mixing virtual storage drives with physical storage drives to create selected RAID arrays.

4. The method of claim 1, wherein utilizing the virtual storage drives in the storage system comprises not mixing virtual storage drives with physical storage drives to create selected RAID arrays.

5. The method of claim 1, wherein utilizing the virtual storage drives in the storage system comprises ensuring that performance and/or redundancy requirements associated with a specific RAID level are satisfied when utilizing the virtual storage drives in the RAID arrays.

6. The method of claim 1, wherein utilizing the virtual storage drives in the storage system to create RAID arrays comprises utilizing the virtual storage drives in the storage system as spares in the RAID arrays.

7. The method of claim 1, wherein pooling the unused storage space to create virtual storage drives comprises pooling the unused storage space of physical storage drives of similar performance characteristics to create virtual storage drives.

8. A computer program product for reclaiming storage space in RAID arrays made up of heterogeneous storage drives, the computer program product comprising a computer-readable medium having computer-usable program code embodied therein, the computer-usable program code configured to perform the following when executed by at least one processor:
   determine a most common storage capacity for a plurality of physical storage drives utilized in a storage system;
   identify, from the plurality of physical storage drives, physical storage drives that contain unused storage space;
   pool the unused storage space to create virtual storage drives with storage capacities substantially equal to the most common storage capacity; and
   utilize the virtual storage drives in the storage system to create RAID arrays.

9. The computer program product of claim 8, wherein pooling the unused storage space to create virtual storage drives comprises creating a single virtual storage drive by using the storage space from multiple physical storage drives.

10. The computer program product of claim 8, wherein utilizing the virtual storage drives in the storage system comprises mixing virtual storage drives with physical storage drives to create selected RAID arrays.

11. The computer program product of claim 8, wherein utilizing the virtual storage drives in the storage system comprises not mixing virtual storage drives with physical storage drives to create selected RAID arrays.

12. The computer program product of claim 8, wherein utilizing the virtual storage drives in the storage system comprises ensuring that performance and/or redundancy requirements associated with a specific RAID level are satisfied when utilizing the virtual storage drives in the RAID arrays.

13. The computer program product of claim 8, wherein the computer-usable program code is further configured to, when not enough unused storage space is available to create a virtual storage drive with the most common storage capacity, utilize the unused storage space to create a virtual storage drive with a next most common storage capacity.

14. The computer program product of claim 8, wherein pooling the unused storage space to create virtual storage drives comprises pooling the unused storage space of physical storage drives of similar performance characteristics to create virtual storage drives.

15. A system for reclaiming storage space in RAID arrays made up of heterogeneous storage drives, the system comprising:
   at least one processor;
   at least one memory device coupled to the at least one processor and storing instructions for execution on the at least one processor, the instructions causing the at least one processor to:
      determine a most common storage capacity for a plurality of physical storage drives utilized in the storage system;
      identify, from the plurality of physical storage drives, physical storage drives that contain unused storage space;
      pool the unused storage space to create virtual storage drives with storage capacities substantially equal to the most common storage capacity; and
      utilize the virtual storage drives in the storage system to create RAID arrays.

16. The system of claim 15, wherein pooling the unused storage space to create virtual storage drives comprises creating a single virtual storage drive by using the storage space from multiple physical storage drives.

17. The system of claim 15, wherein utilizing the virtual storage drives in the storage system comprises mixing virtual storage drives with physical storage drives to create selected RAID arrays.

18. The system of claim 15, wherein utilizing the virtual storage drives in the storage system comprises not mixing virtual storage drives with physical storage drives to create selected RAID arrays.

19. The system of claim 15, wherein utilizing the virtual storage drives in the storage system comprises ensuring that performance and/or redundancy requirements associated with a specific RAID level are satisfied when utilizing the virtual storage drives in the RAID arrays.

20. The system of claim 15, wherein pooling the unused storage space to create virtual storage drives comprises pooling the unused storage space of physical storage drives of similar performance characteristics to create virtual storage drives.

* * * * *